Patented Nov. 12, 1940

2,221,271

UNITED STATES PATENT OFFICE 2,221,271

ALKYL AND CYCLOALKYL DERIVATIVES OF 1,3-DIMETHYL-1,3 - DIPHENYL - CYCLOBUTANE

Frank B. Smith and Harold W. Moll, Midland, Mich., assignors to The Dow Chemical Company, Midland, Mich., a corporation of Michigan No Drawing. Application December 13, 1939, Serial No. 308,964

11 Claims. (Cl. 260—671)

This invention concerns certain new chemical compounds, namely, alkylated and cycloalkylated 1,3-dimethyl-1,3-diphenyl-cyclobutanes, as well as mixtures comprising the same. These compounds and their mixtures are in general high-boiling viscous liquids which may be employed as plasticizing agents for cellulose derivative compositions. Ethyl cellulose compositions plasticized with the new agents have high surface hardness and at the same time are tougher and more flexible than unplasticized compositions. The new compounds are also useful as intermediates in the preparation of other synthetic organic chemicals.

Our new alkylated and cycloalkylated 1,3-dimethyl-1,3-diphenyl-cyclobutanes may be defined by the general formula

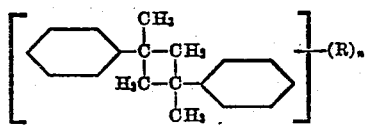

wherein R represents an alkyl group, such as methyl, ethyl, isopropyl, tertiarybutyl, hexyl, lauryl, etc., or a cycloalkyl group, such as cyclopentyl, cyclohexyl, 1-ethylcyclohexyl cycloheptyl, etc., and $n$ represents an integer not greater than 3. These compounds are preferably prepared by reacting an olefine, e. g. ethylene, propylene, diisobutylene, etc., or a cyclo-olefine, e. g. cyclohexene, 1-methyl-cyclohexene, etc., with 1,3-dimethyl-1,3-diphenyl-cyclobutane in the presence of an alkylation catalyst, e. g. aluminum chloride, iron chloride, boron trifluoride, acid activated bleaching earths, such as those sold under the trade names Retrol and Tonsil, etc. If desired, however, other alkylating or cycloalkylating agents, such as the alkyl or cycloalkyl chlorides or bromides, may be employed. The 1,3-dimethyl-1,3-diphenyl-cyclobutane employed as the starting material is a white crystalline solid having a melting point of 52.5° C. and is obtained by polymerizing alpha-methyl-styrene.

The reactants may be employed in any desired proportions, although the products vary in properties with changes in such proportions. Thus, when a molecular excess of 1,3-dimethyl-1,3-diphenyl-cyclobutane is employed, the product is usually a liquid mixture comprising mono-substituted 1,3-dimethyl-1,3-diphenyl-cyclobutanes and smaller proportions of di- and poly-substituted derivatives. An increased yield of the more highly substituted compounds may be obtained by increasing the proportion of the alkylating agent or by alkylating the mono-substituted compounds obtained from a previous reaction. Ordinarily, however, we prefer to employ approximately 1-4 moles of the alkylating or cycloalkylating agent per mole of 1,3-dimethyl-1,3-diphenyl-cyclobutane. The proportion of catalyst varies with the particular reactants employed and the conditions under which the reaction is carried out, but we usually employ between about 0.01 and 0.15 part by weight of catalyst per part of 1,3-dimethyl-1,3-diphenyl-cyclobutane.

The reaction is conveniently carried out by heating a mixture of the reactants and catalyst in a closed vessel to a reaction temperature for ½ to 5 hours, although a somewhat longer period of time may sometimes be required to secure complete reaction. When aluminum chloride and the like is employed as the catalyst, the reaction usually takes place readily at a temperature of approximately 25°–100° C., whereas somewhat higher temperatures, e. g. 150°–300° C. are required when employing an acid activated bleaching earth catalyst. The reaction may also be carried out under atmospheric pressure at reflux temperature. Upon completion of the reaction, the mixture is treated to remove the catalyst, and any unreacted 1,3-dimethyl-1,3-diphenyl-cyclobutane and alkylating or cycloalkylating agent are removed by fractional distillation under vacuum. The product thus obtained comprises a liquid mixture of isomeric mono-, di-, and poly-alkylated or cycloalkylated 1,3-dimethyl-1,3-diphenyl-cyclobutanes which may be employed directly as a plasticizing agent, intermediate, etc., or which may be further fractionally distilled to obtain fractions representing isomeric mono-substituted 1,3-dimethyl-1,3-diphenyl-cyclobutanes, isomeric di-substituted 1,3 - dimethyl - 1,3 - diphenyl-cyclobutanes, etc.

The following examples illustrate several ways in which the principle of the invention has been applied, but are not to be construed as limiting the same.

Example 1

A mixture of 708 grams (3.0 moles) of 1,3-dimethyl-1,3-diphenyl-cyclobutane, 340 grams (6.1 moles) of mixed butylenes, and 100 grams of Retrol from which the residual water had been removed was placed in a closed stainless steel vessel. The mixture was heated with stirring at a temperature of about 250° C. for approximately 2 hours, after which time it was cooled and filtered to remove the Retrol. The crude butylated 1,3-dimethyl-1,3-diphenyl-cyclobutane was a fluorescent red liquid. It was fractionally distilled under vacuum to obtain the following fractions:

|  | Fraction No. | | | | |
|---|---|---|---|---|---|
|  | 1 | 2 | 3 | 4 | 5 |
| Appearance | Liquid | Slightly viscous liquid. | Viscous light yellow liquid. | Viscous yellow liquid. | Brittle red resin. |
| Yield in grams | 470 | 156 | 75 | 30 | 70. |
| Boiling range | 87°–182° C. at 20 mm. | 182°–220° C. at 20 mm. | 220°–260° C. at 20 mm. | 240°–260° C. at 7 mm. | Above 260° C. at 7 mm. |
| Specific gravity at 25/25° C | 0.964 |  | 0.956 | 0.963 at 40/25° C |  |
| Refractive index at 25° C | 1.5445 |  | 1.5402 | 1.5465 |  |

Fraction 1 above consisted of polymerized butylene and unreacted 1,3-dimethyl-1,3-diphenyl-cyclobutane. Fraction 2 consisted largely of isomeric mono-butyl-1,3-dimethyl-1,3-diphenyl-cyclobutane, Fraction 3 consisted largely of isomeric di-butyl-1,3-dimethyl-1,3-diphenyl-cyclobutane, and Fraction 4 consisted of a mixture of isomeric di- and tri-substituted compounds. Fraction 5 contained the more highly butylated products.

Example 2

A mixture of 708 grams (3.0 moles) of 1,3-dimethyl-1,3-diphenyl-cyclobutane, 492 grams (6.2 moles) of cyclohexene, and 100 grams of Retrol from which the residual water had been removed was placed in a closed steel vessel. The mixture was heated with stirring at a temperature of 205°–210° C. for approximately ½ hour, during which time a sharp decrease in pressure within the vessel indicated that reaction was taking place. The reaction mixture was removed from the vessel, cooled to a temperature of approximately 150° C., and filtered. The crude cyclohexylated product was a fluorescent yellow liquid. It was fractionally distilled under vacuum to obtain the following fractions:

Fractions 1 and 2 above consist of polymerized cyclohexene and unreacted 1,3-dimethyl-1,3-diphenyl-cyclobutane, respectively. Fraction 3 consists largely of monocyclohexylated 1,3-dimethyl-1,3-diphenyl-cyclobutanes and Fraction 4 consists of a mixture of mono- and di-cyclohexylated derivatives. Fraction 5 contains more highly cyclohexylated 1,3-dimethyl-1,3-diphenyl-cyclobutanes.

Example 3

A mixture of 708 grams (3.0 moles) of 1,3-dimethyl-1,3-diphenyl-cyclobutane, 336 grams (3.0 moles) of octylene (B. P. 120°–125° C. at 752 mm.), and 100 grams of dried Retrol was heated at a temperature of about 250° C. for approximately 2 hours as in Example 1. The crude product, deep purple in color, was filtered to remove the catalyst and was fractionally distilled under vacuum as follows:

|  | Fraction No. | | | | | |
|---|---|---|---|---|---|---|
|  | 1 | 2 | 3 | 4 | 5 | 6 |
| Appearance | Colorless liquid | White crystals | Light yellow liquid. | Light yellow liquid. | Yellow liquid | Dark red oil. |
| Yield in grams | 63 | 449 | 65 | 121 | 142 | 52. |
| Boiling range | 40°–135° C. at 20 mm. | 135°–210° C. at 20 mm. | 210°–235° C. at 20 mm. | 235°–250° C. at 20 mm. | 250° at 20 mm. to 257° C. at 8 mm. | Above 257° C. at 8 mm. |
| Specific gravity at 25/25° C | 0.791 |  | 0.929 | 0.933 | 0.930 | 0.927. |
| Refractive index at 25° C | 1.4446 |  | 1.5240 | 1.5289 | 1.5232 | 1.5217. |

Fractions 1 and 2 consisted of unreacted octylene and 1,3-dimethyl-1,3-diphenyl-cyclobutane, respectively. Fraction 3 was a mixture of unreacted material and mono-octyl-1,3-dimethyl-1,3-diphenyl-cyclobutane. Fractions 4, 5, and 6 consisted essentially of isomeric mono-, di, and tri-octyl-1,3-dimethyl-1,3-diphenyl-cyclobutanes, respectively.

Example 4

A mixture of 354 grams (1.5 moles) of 1,3-dimethyl-1,3-diphenyl-cyclobutane, 357 grams (1.5 moles) of a mixture of isomeric heptadecylenes (B. P. 176°–200° C. at 20 mm.), and 100 grams of dried Retrol was placed in a flask fitted with a stirrer, reflux condenser, and thermocouple. The mixture was heated at a temperature of about 250°–265° C. for 1½ hours, after which time it was cooled and filtered to remove the Retrol.

|  | Fraction No. | | | | |
|---|---|---|---|---|---|
|  | 1 | 2 | 3 | 4 | 5 |
| Appearance | Thin, colorless liquid. | Crystalline solid | Yellow liquid | Viscous yellow liquid. | Very viscous brown tar. |
| Yield in grams | 55 | 302 | 355 | 100 | 138. |
| Boiling range | 70°–120° C. at 20 mm. | 120°–225° C. at 20 mm. | 225°–260° C. at 20 mm. | 260°–310° C. at 20 mm. | Above 310° C. at 20 mm. |
| Specific gravity 60/60° C |  |  | 0.986 | 0.990 | 1.004. |
| Refractive index at 25° C |  |  | 1.5540 | 1.5373 | 1.5392. |

The crude product, light yellow in color, was fractionally distilled as follows:

|  | Fraction No. | | | |
|---|---|---|---|---|
|  | 1 | 2 | 3 | 4 |
| Appearance | Liquid | Yellow liquid | Yellow liquid | Red liquid. |
| Yield in grams | 331 | 23 | 240 | 84. |
| Boiling range | Up to 210° C. at 20 mm | 210°–250° C. at 20 mm | 223°–289° C. at 7 mm | Above 289° C. at 7 mm. |
| Specific gravity at 25/25° C |  | 0.888 | 0.895 | 0.893. |
| Refractive index at 25° C |  | 1.4930 | 1.5022 | 1.5016. |

Fraction 1 above consisted essentially of unreacted material. Fraction 2 was a mixed fraction containing a large proportion of mono-heptadecyl 1,3-dimethyl-1,3-diphenyl-cyclobutane. Fraction 3 consisted essentially of mono-heptadecyl-1,3-dimethyl-1,3-diphenyl-cyclobutane, and Fraction 4 contained more highly substituted compounds.

Other 1,3-dimethyl-1,3-diphenyl-cyclobutane derivatives of the present class which may be prepared by procedure analogous to that described above include methylated 1,3-dimethyl-1,3-diphenyl-cyclobutane, ethylated 1,3-dimethyl-1,3-diphenyl-cyclobutane, isopropylated 1,3-dimethyl-1,3-diphenyl-cyclobutane, amylated 1,3-dimethyl-1,3-diphenyl cyclobutane, hexylated 1,3-dimethyl-1,3-diphenyl-cyclobutane, decylated 1,3-dimethyl-1,3-diphenyl-cyclobutane, cyclobutylated 1,3-dimethyl-1,3-diphenyl-cyclobutane, cyclopentylated 1,3-dimethyl-1,3-diphenyl-cyclobutane, 4-ethylcyclohexylated 1,3-dimethyl-1,3-diphenyl-cyclobutane, etc.

This application is a continuation-in-part of our co-pending application, Serial No. 227,207, filed August 27, 1938.

Other modes of applying the principle of our invention may be employed instead of those explained, change being made as regards the method herein disclosed or the materials employed, provided the products claimed in any of the following claims be obtained.

We claim:

1. A hydrocarbon-substituted 1,3-dimethyl-1,3-diphenyl-cyclobutane having the general formula

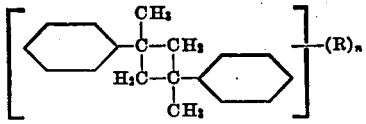

wherein R represents a hydrocarbon radical selected from the class consisting of alkyl and cycloalkyl groups, and $n$ represents an integer not greater than 3.

2. An alkyl-substituted 1,3-dimethyl-1,3-diphenyl-cyclobutane having the general formula

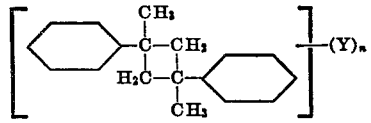

wherein Y represents an alkyl group, and $n$ represents an integer not greater than 3.

3. A cycloalkyl-substituted 1,3-dimethyl-1,3-diphenyl-cyclobutane having the general formula

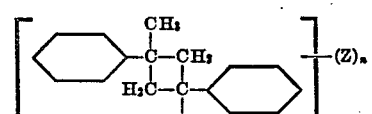

wherein Z represents a cycloalkyl group, and $n$ represents an integer not greater than 3.

4. A butyl-substituted 1,3-dimethyl-1,3-diphenyl-cyclobutane, said product having the general formula

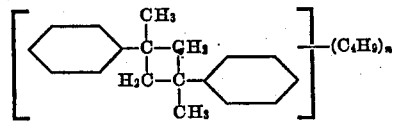

wherein $n$ represents an integer not greater than 3, and existing in the liquid state at temperatures below about 182° C. under 20 millimeters pressure.

5. An octyl-substituted 1,3-dimethyl-1,3-diphenyl-cyclobutane, said product having the general formula

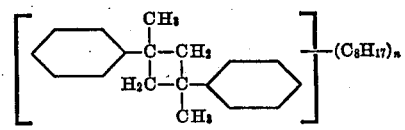

wherein $n$ represents an integer not greater than 3, and existing in the liquid state at temperatures below about 235° C. under 20 millimeters pressure.

6. A cyclohexyl-substituted 1,3-dimethyl-1,3-diphenyl-cyclobutane, said product having the general formula

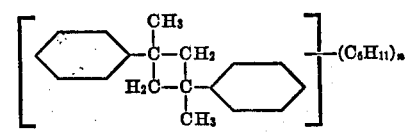

wherein $n$ represents an integer not greater than 3, and existing in the liquid state at temperatures below about 225° C. under 20 millimeters pressure.

7. A mixture consisting substantially of isomeric mono-butyl-1,3-dimethyl-1,3-diphenyl-cyclobutane, said mixture being a light yellow liquid distilling at temperatures between about 182° and about 220° C. under 20 millimeters pressure and having a specific gravity of approximately 0.964 at 25/25° C.

8. A mixture consisting substantially of mono-octyl-1,3-dimethyl-1,3-diphenyl-cyclobutanes, said mixture being a light yellow liquid distilling at temperatures between about 235° and about 250° C. under 20 millimeters pressure and having a specific gravity of approximately 0.938 at 25/25° C.

9. A mixture consisting substantially of isomeric mono-cyclohexyl-1,3-dimethyl-1,3-diphenyl-cyclobutanes, said mixture being a viscous yellow liquid distilling at temperatures between about 225° and about 260° C. under 20 millimeters pressure and having a specific gravity of approximately 0.986 at 60/60° C.

10. A method for the preparation of alkylated and cycloalkylated 1,3-dimethyl-1,3-diphenyl-cyclobutanes which comprises heating 1,3-dimethyl-1,3-diphenyl-cyclobutane with an agent selected from the class consisting of olefines and cycloolefines in the presence of an alkylation catalyst.

11. A method for the preparation of alkylated and cycloalkylated 1,3-dimethyl-1,3-diphenyl-cyclobutanes which comprises heating 1,3-dimethyl-1,3-diphenyl-cyclobutane with an agent selected from the class consisting of olefines and cycloolefines to a temperature between about 150° and 300° C. in the presence of an acid activated bleaching earth catalyst.

FRANK B. SMITH.
HAROLD W. MOLL.